United States Patent [19]

Anderson

[11] 3,956,625

[45] May 11, 1976

[54] MULTIPLE FLASHLAMP ARRAY

[75] Inventor: Robert M. Anderson, Pepper Pike, Ohio

[73] Assignee: General Electric Company, Schenectady, N.Y.

[22] Filed: Nov. 14, 1974

[21] Appl. No.: 523,564

[52] U.S. Cl.................................. 240/1.3; 431/13; 431/95 A
[51] Int. Cl.².......................................... F21K 5/02
[58] Field of Search.................................. 240/1.3; 431/93–95, 95 A, 13

[56] References Cited
UNITED STATES PATENTS

| | | | |
|---|---|---|---|
| 3,513,304 | 5/1970 | Ott | 240/1.3 |
| 3,586,470 | 6/1971 | Brown | 240/1.3 |
| 3,598,984 | 8/1971 | Slomski | 240/1.3 |
| 3,676,663 | 7/1972 | Beare et al | 240/1.3 |

*Primary Examiner*—Carroll B. Dority, Jr.
*Attorney, Agent, or Firm*—John F. McDevitt; Lawrence R. Kempton; Frank L. Neuhauser

[57] ABSTRACT

A multiple photoflash lamp array is disclosed capable of producing a plurality of flashes for taking a plurality of flash pictures. The particular construction includes a reflector unit having a plurality of adjacent reflectors or reflector cavities, each having a photoflash lamp mounted therein on a common base and with said flashlamps being further operatively associated with a printed circuitboard member to enable flashing of the lamps individually and in sequence. Aperture means are also provided in the individual reflectors to permit tne direct observation by eye of flash indicator means located behind the reflector unit.

4 Claims, 2 Drawing Figures

MULTIPLE FLASHLAMP ARRAY

CROSS-REFERENCE TO RELATED APPLICATIONS

A planar type multiple photoflash lamp array having a single reflector unit wherein the individual reflectors are provided with aperture means to permit viewing of flash indicator means located behind the reflector unit is disclosed and claimed in a number of previously filed applications which are assigned to the assignee of the present invention. A particular form of said array is disclosed in patent application Ser. No. 508,334, filed Sept. 23, 1974, Richard Blount, entitled "Photoflash Array Construction," while still other features for said array are disclosed in application Ser. No. 510,323, filed Sept. 30, 1974, Richard Blount, and entitled "Photoflash Lamp Array Having Radiation Switches and Flash Indicators." In application Ser. No. 510,362, filed Sept. 30, 1974, in the names of Richard Blount, Paul T. Cote', and Edward C. Zukowski, and entitled "Flash Array Having Shield Switching Circuit," there is disclosed particular circuit means for employing said array. A still more recently filed application Ser. No. 520,451, filed Nov. 4, 1974, now abandoned, Richard Blount, entitled "Photoflash Lamp Array Having Shielded Switching Circuit," discloses different shielding means for the same type multilamp array.

BACKGROUND OF THE INVENTION

Indicia means are already employed in commercially available multiple flashlamp arrays wherein colored flash indicator dots are located on the top surface of the transparent cover in the assembly. This requires some physical movement of the entire assembly from the position of taking pictures in order to observe the color change indicating that certain lamps have already been flashed. As an example, there is a commercial flashcube type array with top portions of the individual reflector cavities being contoured so as to permit light passage when the individual lamps are flashed for color change of juxtapositioned dots located thereover as the flash indication means. Additionally, there is also a commercial linear type photoflash array having two rows of reflector cavities facing in opposite directions to form a two-sided array wherein the same type flash indication means is located in the top surface of the transparent cover which holds the entire assembly together as a unit.

SUMMARY OF THE INVENTION

It has now been discovered that aperture means located at the base end of the individual reflector cavities can permit direct eye observation of flash indicator means disposed behind the reflector unit of a planar type multiple flashlamp array. More particularly, a planar type multiple flashlamp array constructed in accordance with the present invention comprises a base member, a reflector unit mounted on said base having a plurality of outwardly facing reflectors in a linear row arranged in side-by-side relationship and facing outwardly in the same direction, a plurality of flashlamps mounted on said base with each one of said lamps being positioned within a respective one of said reflectors, and a circuitboard member operatively associated with said lamps to flash the lamps in sequence or individually, wherein the improvement consists of having aperture means disposed at the base end of the individual reflectors to permit direct eye observation of flash indicator means disposed behind said reflector unit. Various forms of flash indicator means can be operatively associated to provide the direct eye observation of a color change without requiring any physical movement of the flashlamp array when flashlamps on the opposite side of the array from the observation side have been flashed. In a preferred embodiment, a film of heat shrinkable thermoplastic polymer is simply inserted between a pair of nested side-by-side reflector units forming a two-sided linear array such as disclosed, for example, in U.S. Pat. No. 3,598,984, Slomski, dated Aug. 10, 1971, so as to permit visible indication through the aforesaid aperture means which are aligned therewith when the aligned portions of the plastic sheet shrink or melt from the heat or radiant energy produced from an adjacent flashing lamp. The color change produced at said aperture openings can be enhanced by coloring the plastic material with dyes, pigments, or other suitable means and is further enhanced if light passage is permitted from the flashing lamps to said polymer sheet by providing separate holes or other aperture means behind the flashlamps in the individual reflector cavity as will be more fully described hereinafter with respect to said preferred embodiments. In a different preferred embodiment, the flash indicator mean consists of a flash indicator material in the form of a coating provided either on the rear side of the reflector cavities or on the base end of the individual flashlamps at locations aligned with the observation aperture means. For observation of a color change when coatings are applied to the base end of the individual flashlamps, it will also be necessary to have separate openings in the individual reflector cavities which are aligned with the observation aperture means.

DESCRIPTION OF THE PREFERRED EMBODIMENTS

Figure 1:
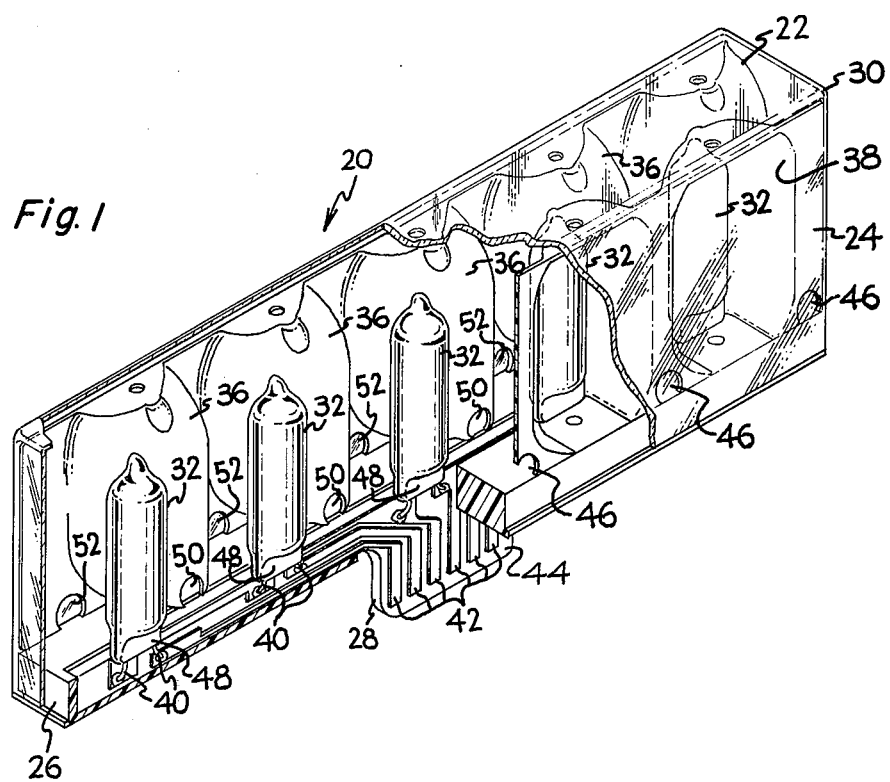
FIG. 1 is a perspective view of a multiple flashlamp array in accordance with a preferred embodiment of the invention.

Referring to FIG. 1, there is illustrated a linear or planar type multiple flashlamp array 20 generally comprising two rows of side-by-side reflector units 22 and 24 mounted upon an elongated molded plastic base supporting member 26 which further supports a circuitboard member 28 along with transparent cover means 30 which is secured thereto. The individual reflector units are suitably provided with a specular reflective coating of a suitable metal such as aluminum, as by well-known metal vaporization vacuum deposition processes or other suitable technique. Individual flashlamps 32 are mounted upon the base member within respective ones of the reflector cavities 36 and 38 of reflector units 22 and 24, respectively, as shown, to rest upon the base support member 26. The lead-in wires 40 of said flashlamps 32 in the array 20 are electrically connected to respective terminal contact strips 42 of a contact tab 44 on circuitboard member 28 projecting from the bottom side of the base support member 26.

In this particular embodiment, observation aperture means 46 are disposed at the base end and offset from the reflector cavities 38 to permit direct eye observation of flash indicator means located behind said reflector unit 24 and with said flash indicator means being in the form of a coating on the base end of the individual flashlamps (not shown) mounted in the individual reflector cavities 36 of reflector unit 22. More particularly, the base ends 48 of all flashlamps 32 mounted in both reflector units 22 and 24 have been coated with a flash indicator material providing a color change through thermal decomposition when the lamps are flashed and such color change can be observed in the lamps mounted in reflector unit 22 through the openings 50 in the reflector cavities 36 of said unit by reason of the alignment provided for said openings with the aperture means 46 in reflector unit 24. Correspondingly, the observation aperture means 52 disposed in the same manner for reflector unit 22 permit direct eye observation of flash indicator means disposed behind said reflector unit when the flashlamps 32 are flashed in reflector unit 24.

Figure 2:
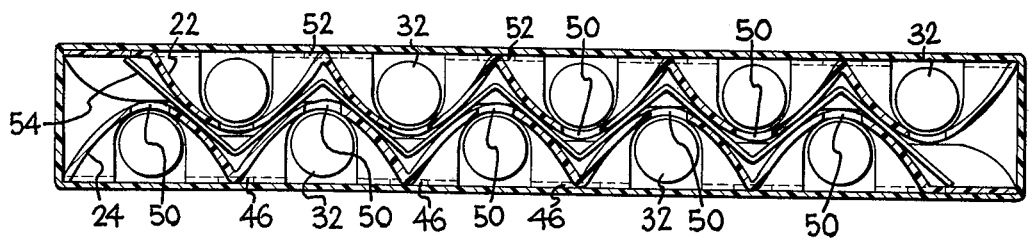
FIG. 2 is a horizontal section of the same type linear type photoflash array in FIG. 1 but modified in accordance with a different preferred embodiment of the invention.

In FIG. 2 there is shown a horizontal section of a different preferred embodiment of the present invention. Accordingly, a thin sheet 54 of heat shrinkable thermal plastic polymer such as biaxially oriented polypropylene is inserted in zigzag fashion between the nested backs of reflector units 22 and 24. The alignment of said flash indicator material with the aperture openings 46 and 52 provided in said reflector units 24 and 22, respectively, permits a shrinkage or melting of the plastic material when subjected to heat or radiant energy from an adjacent flashlamp to produce a color change which is visible at the observation openings. The flashlamps 32 are mounted in the respective reflector units as described in the preceding embodiment with ancillary openings 50 being provided in the individual reflector cavities permitting localized light or heat passage to the plastic sheet when actuated in the aforesaid manner. The direct alignment of said openings 50 in the reflector cavities with the observation aperture means 46 and 52 in reflector units 24 and 22, respectively, cooperates to permit direct eye observation of the particular flash indicator means being employed. Said ancillary openings 50 further provide venting means to minimize or prevent distortion of an adjacent reflector cavity in the same row or in the opposite row when a nearby lamp is flashed. In this particular lamp configuration, the individual flashlamps are again electrically connected to a printed circuitboard member with electrical contact being made to a camera by the contact tab in the same manner described for the preceding embodiment.

It will be apparent from the foregoing description that various other embodiments and modifications of the present invention will be apparent to the person skilled in the art. For example, openings in the individual cavities of the reflector units can be avoided by providing a flash indicator coating at localized areas on the rear surface of the reflector units which are aligned with the observation aperture openings provided in the oppositely facing reflector units. It is intended, therefore, to limit the present invention only by the scope of the following claims.

What I claim as new and desire to secure by Letters Patent of the United States is:

1. In a planar type multiple flashlamp array comprising a base member, a pair of oppositely facing reflector units mounted on said base with each reflector unit having a plurality of outwardly facing reflector cavities disposed in a linear row arranged in side-by-side relationship and facing outwardly in the same direction, a plurality of flashlamps having base ends with each one of said lamps being positioned within a respective one of said reflectors, and a circuitboard member which supports and is operatively associated with said lamps to flash the lamps in sequence, the improvement which comprises having observation aperture means in the form of a pair of openings disposed adjacent said lamp base ends so that the first opening is located in each of said reflector cavities and the second opening is located behind said reflector cavities in the oppositely facing reflector unit and aligned with the first opening with flash indicator means also being aligned with said openings.

2. An improved flashlamp array as in claim 1 wherein the flash indicator means provides a color change when actuated.

3. An improved flashlamp array as in claim 2 wherein the flash indicator means is a film of heat shrinkable thermoplastic polymer.

4. An improved flashlamp array as in claim 1 wherein the flash indicator means is in the form of a coating on the base end of the individual lamps.

* * * * *